May 15, 1962 F. W. ARMSTRONG, JR., ETAL 3,035,157
ARC WELDING

Filed Nov. 16, 1959

INVENTORS
Frank W. Armstrong Jr.
Otis R. Carpenter
BY
ATTORNEY

May 15, 1962  F. W. ARMSTRONG, JR., ET AL  3,035,157
ARC WELDING
Filed Nov. 16, 1959  4 Sheets-Sheet 2

INVENTORS
Frank W. Armstrong Jr.
BY  Otis R. Carpenter

ATTORNEY

May 15, 1962 F. W. ARMSTRONG, JR., ETAL 3,035,157
ARC WELDING
Filed Nov. 16, 1959 4 Sheets-Sheet 3

INVENTORS
Frank W. Armstrong, Jr.
BY Otis R. Carpenter
ATTORNEY

May 15, 1962  F. W. ARMSTRONG, JR., ETAL  3,035,157
ARC WELDING
Filed Nov. 16, 1959  4 Sheets-Sheet 4

INVENTORS
Frank W. Armstrong Jr.
BY   Otis R. Carpenter
ATTORNEY

United States Patent Office 3,035,157
Patented May 15, 1962

3,035,157
ARC WELDING
Frank W. Armstrong, Jr., and Otis R. Carpenter, Barberton, Ohio, assignors to The Babcock & Wilcox Company, New York, N.Y., a corporation of New Jersey
Filed Nov. 16, 1959, Ser. No. 853,401
5 Claims. (Cl. 219—125)

The present invention relates to welding apparatus, and more particularly to welding apparatus for attaching thin walled, closely spaced tubes to a heavy walled tube sheet.

In the present invention, we provide a welding tool of the non-consumable electrode type where the electrode and weld wire are mounted for rotation about a fixed axis. The welding apparatus includes a structure for positively and controllably feeding the weld wire to the arc and for moving the assembly in a predetermined closed path. The apparatus includes an arrangement for automatically or manually vertically re-positioning the welding unit after each pass of the welding electrode. With this construction, multiple beads of weld metal may be deposited on the work under the complete control by the operator. The welding apparatus is further provided with provision for progressively reducing the welding current at the end of the welding procedure so as to avoid the formation of a crater on the weld bead or on the tube sheet. With the equipment hereinafter described, it becomes practical to weld thin walled tubes into a heavy walled tube sheet with multiple welding passes even though the tubes are closely spaced.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 1:
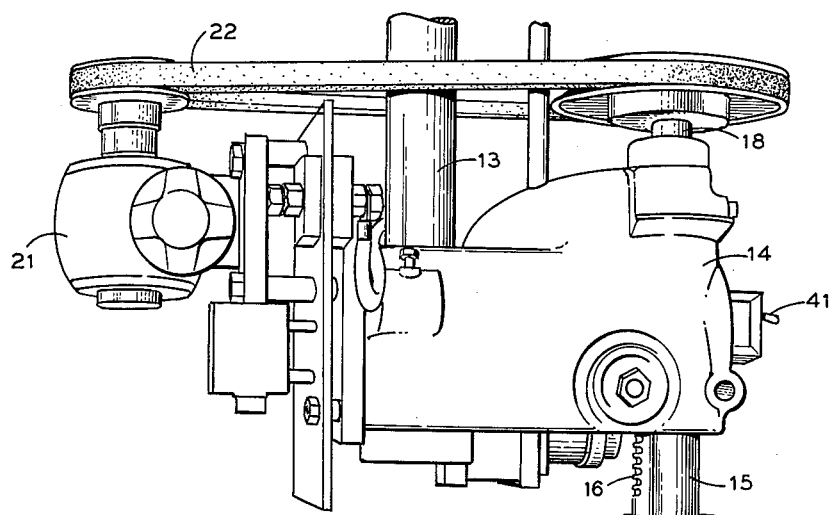
FIG. 1 is an elevation of a welding tool constructed and arranged in accordance with the present invention.
Figure 5:
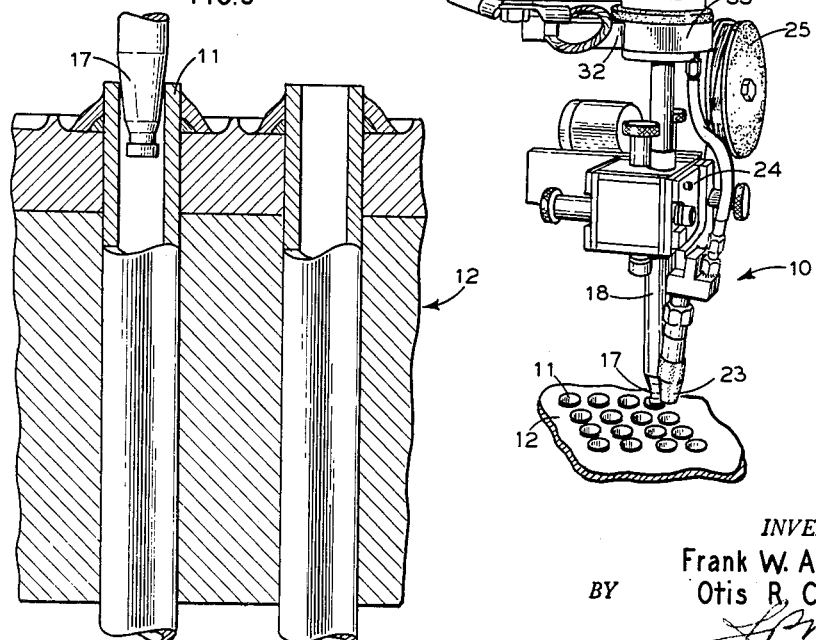
FIG. 5 illustrates the character of the weld deposited by the apparatus of FIGS. 1 to 4.

In the embodiment of the invention disclosed in the drawings, the welding assembly 10 is mounted for horizontal movement so as to be positioned in proper relationship to thin walled tubes 11 which are to be assembled in closely spaced relation and welded in a relatively heavy wall tube sheet 12. This is accomplished by a depending arm 13 supporting a housing 14 having a downwardly extending shaft 15 on which the welding tool 10 and its related motorized equipment is mounted. The welding head or tool 10 is positioned at the lower end of a vertically adjustable mechanism which includes an assembly of stationary and rotating shafts as hereinafter described. With the arrangement described, the horizontal position of the welding tool relative to the tubes 11 and the tube sheet 12 may be manually manipulated. The proper position of the welding head relative to the work position may be adjusted vertically by means of a pinion (not shown) and a rack 16.

The tool is provided with a vertically extending stationary hollow shaft 17 which may be of a selected diameter, for example ⅜" to ¾" with the lower end constructed and arranged to engage the particular tube 11 to be welded to the tube sheet 12. This shaft is stationary and extends from the general location of the weld upwardly through the supporting housing 14 to a connection for the admission and extraction of cooling water. The shaft 17 is stationary and forms the axis of rotation of the welding head and is provided with a small diameter interior tube (not shown) of, for example, ⅛" internal diameter so that cooling water may be delivered to and removed from the lower end of the centering shaft 17.

Figure 2:
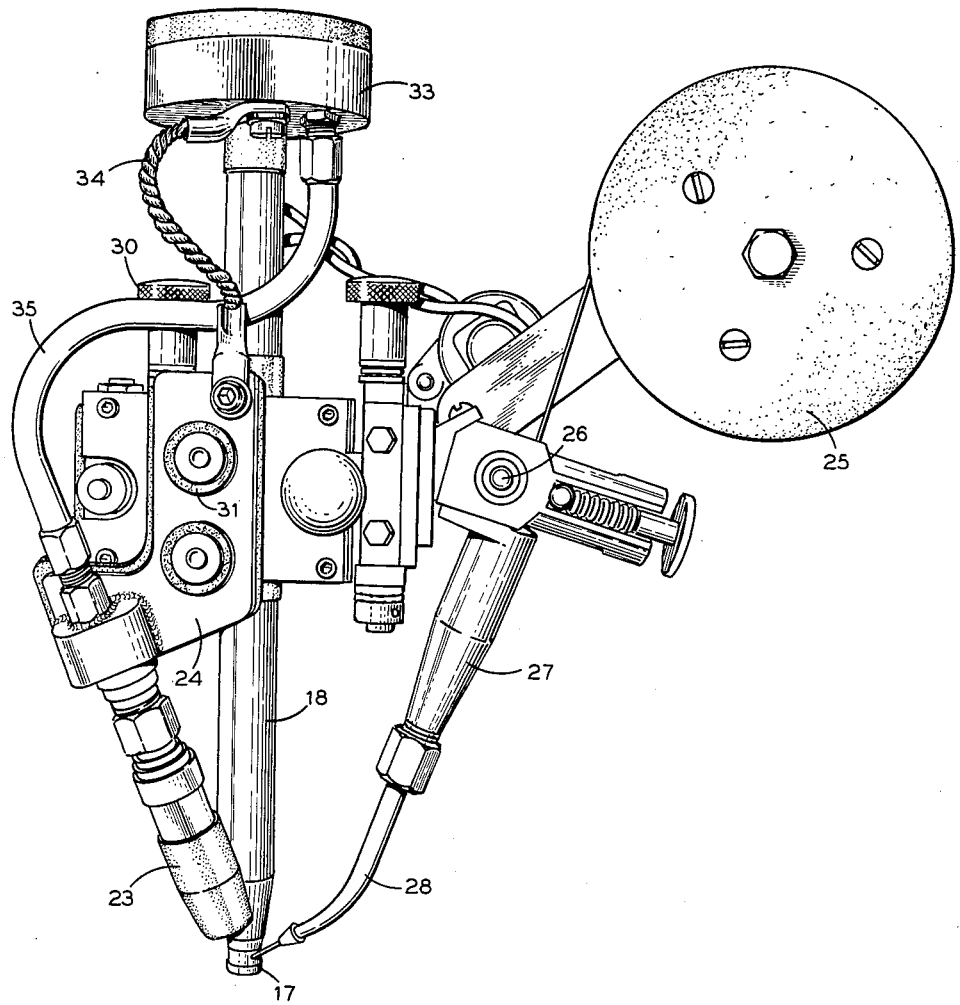
FIG. 2 is an enlarged elevation of the lower portion of the apparatus shown in FIG. 1.

As shown in FIG. 1, and in more detail in FIG. 2, a rotating sleeve 18 telescopically surrounds the centering shaft 17 to support the welding head of the tool. The sleeve 18 is mounted for rotation about the centering shaft 17 and driven by a motor speed reducer assembly 21 which is connected to the rotating sleeve 18 on the upper side of the housing 14 by a chain or belt 22.

Referring more particularly to FIG. 2, a non-consumable tungsten electrode torch 23 is mounted on the rotating sleeve 18 by means of a yoke 24 which is provided with adjusting and locking means for vertical and lateral adjustment of the welding head relative to the rotating sleeve 18. Thus, by proper adjustment of the yoke 24, the positional relationship between the welding electrode, welding wire and the workpiece may be selected.

On the opposite side of the sleeve 18 and separately mounted for individual adjustment on the yoke 24 is a wire spool 25 and a feeding mechanism for the delivery of weld wire to the arc formed by the tungsten electrode 23. The wire feed arrangement includes a pinch roll drive 26 driven by a motorized speed reducer so that the rate of feed of weld wire to the arc area may be controlled and regulated in accordance with the amount of weld metal desired. The weld wire leaving the pinch roll passes through a hollow metallic fitting 27 which in turn is provided with a tubular end piece 28 which is shaped so that the wire may be properly directed to the arc area as formed by the torch electrode 23. The wire feeding mechanism may be independently adjusted in a vertical direction by means of a threaded slide 30 and 31 so that the desired positional relationship between the electrode and the weld wire delivered to the arc area may be adjusted.

Since the welding head rotates about the axial shaft the power necessary for the formation of the arc is delivered through a brush 32 and a collector ring 33 with the rotating collector directly connected by an electrical lead 34 to the electrode. In a similar manner a brush 29 and a collector ring 39 delivers power to the wire feed motor of the pinch roll drive 26.

The non-consumable electrode torch 23 is also provided with an inert gas, such as argon, which is delivered through a tube from a hollow chamber (not shown) which is formed internally of the collector ring 33. The inert gas is passed downwardly through an annular chamber which extends from a supply pipe 35 through the housing 14 to the collector ring.

Figure 3:
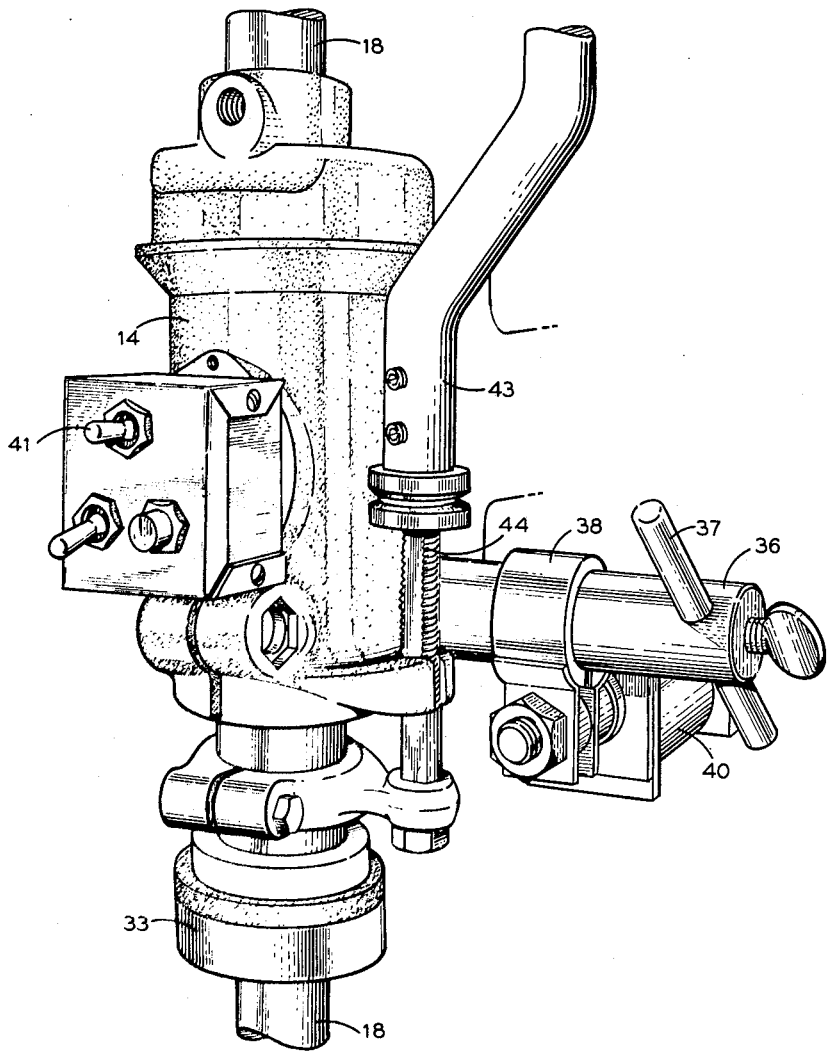
FIG. 3 is an enlarged elevation of an intermediate portion of the apparatus shown in FIG. 1.

As shown in FIGS. 1 and 3, the rack 16 for the vertical adjustment of the rotating sleeve 18 is provided with a well known pinion adjustment device (not shown) operable through a shaft 36 extending outwardly of the housing and a handle 37 so that the vertical position of the welding head may be adjusted. As shown in the drawing, the adjusting handle and shaft is provided with a hydraulically or pneumatically operated brake 38 which engages the shaft 36. Thus, when the proper location of the welding electrode relative to the work has been initially determined by turning the shaft 36, the shaft is locked into position by actuating the power piston 40 of the brake. The downward adjustment, as accomplished through the pinion and rack, compresses a spring (not shown) which is mounted between the rotating sleeve 18 and the centering shaft 17 at the lower end portion of the latter. Thus, as the welding head is moved downwardly into its initial welding position, the spring is compressed.

In accordance with one aspect of the present invention, the hydraulic or pneumatic piston may be momentarily actuated automatically or manually to release the brake 38 and to permit the rotation of the shaft 36 through a predetermined angularity for a selected upward movement of the sleeve 18 and the welding head. This is preferably accomplished either manually or automatically after a bead has been placed circumferentially on the work. Thus, when the second bead is placed on the tube 11 and the sheet 12, the welding head is raised a predetermined selected distance for proper relationship between the first bead formed by the welding arc and the welding tool.

As shown in FIG. 3, the actuation of the operation of the power piston 40 may be accomplished electrically by means of a selector switch 41 mounted on the housing 14.

While the structure shown in FIG. 3 is intended to raise the welding head in amounts sufficient to permit the deposition of a second bead on the work, it will be understood that the same arrangement could be used to deposit more than two beads on the work. Alternately, the tool may be used to fusion weld the tube 11 to the tube sheet 12 during one or more passes of the electrode without weld wire feed, either with or without subsequent vertical re-positioning of the electrode.

Figure 4:
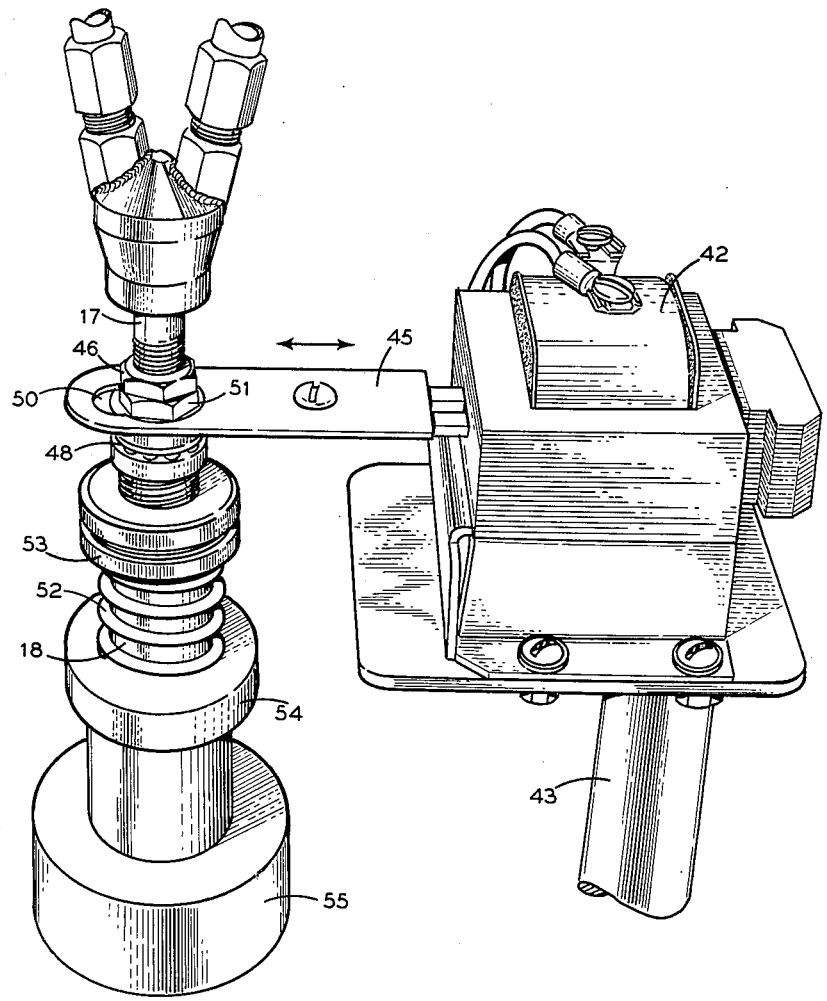
FIG. 4 is an enlarged elevation of the upper portion of the apparatus shown in FIG. 1.

In the embodiment of the invention disclosed in FIG. 4, the upward vertical movement of the welding head for the deposition of a third bead may be accomplished by means of a solenoid 42 mounted on an upright arm 43 attached to the housing 14, and vertically positioned by a threaded connection 44 to the housing. The solenoid horizontally positions a strap or shim 45 in its relationship between a fixed position lock nut 46 on shaft 17 and a thrust bearing 48 engaging the rotating sleeve 18. As shown in this drawing, the shim 45 is provided with an opening 50 near its outer end which has a diameter slightly larger than the diameter of the shaft 17 which it encloses. The opening 50 is slotted toward the solenoid and provided with a larger opening 51 which permits the thrust bearing 48 to move upwardly against the lock nut 46 when the solenoid moves the shim in an outward direction. As shown in FIG. 4, a coil spring 52 is provided which bears at its upper end on a rotating flange 53 which is attached to the upper end portion of the rotating shaft 17. The lower portion of the compression spring bears on the shoulder of a fitting 54 which urges a second flange in gas sealing relationship to an O ring or annular chamber 55 formed between the rotating shaft and the stationary support member of the housing. The argon gas may be delivered to the stationary portion of the housing 14 for downward movement between the shaft and the rotating sleeve 18 to a corresponding opening in the collector ring 33 and thence to the electrode torch 23.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:
1. Welding apparatus comprising means for adjusting a welding electrode to a selected position relative to a workpiece including means for locking said electrode at said selected position, means for directing said welding electrode in a first circuit through a predetermined closed path relative to said workpiece to deposit a weld bead thereon, means for adjusting the electrode position a selected distance relative to the workpiece after the electrode has completed its path of movement including a release for said locking means, means for locking said electrode in said changed position, and means for directing the electrode continuously in a repeat circuit through the same predetermined closed path to deposit a second weld bead on said first weld bead.

2. Welding apparatus comprising means for adjusting a hollow non-consumable welding electrode to a selected position relative to a workpiece including means for locking said electrode at said selected position, means for directing said welding electrode in a predetermined closed path relative to said workpiece to deposit a weld bead, means for passing an inert gas through said electrode toward said workpiece, means for adjusting the electrode position a selected distance relative to the workpiece after the electrode has completed its path of movement including a release for said locking means, means for locking said electrode in said changed position, and means for directing the welding electrode continuously through the same predetermined closed path to deposit a second weld bead on said first weld bead.

3. Welding apparatus comprising means for adjusting a welding torch to a selected position relative to a workpiece including a power piston for locking said torch at said selected position, means for directing said welding torch in a predetermined closed path relative to said workpiece, means for adjusting the torch position a selected distance relative to the workpiece after the torch has completed its path of movement including means actuating said power piston to release said locking means, means for actuating said power piston for relocking said torch in said changed position, and means for directing the welding torch continuously through the same predetermined closed path.

4. Welding apparatus comprising means for adjusting a welding electrode to a selected level above a workpiece including means for locking said electrode at said selected level, means for directing said welding electrode in a predetermined closed path relative to said workpiece to deposit a weld bead thereon, means for raising the electrode a selected distance relative to the workpiece after the electrode has completed its path of movement including a shim having a contoured opening therein and a solenoid operable to move said shim to permit lifting said welding electrode the selected distance equal to the thickness of the shim, and means for directing the welding electrode through the same predetermined closed path for the deposition of a second weld bead on said first bead.

5. Welding apparatus comprising means for adjusting a welding torch to a selected position relative to a workpiece including means for locking said torch at said selected position, means for directing said welding torch in a first circuit through a predetermined closed path relative to said workpiece, means for adjusting the torch position a selected distance relative to the workpiece after the torch has completed its path of movement including a release for said locking means, means for locking said torch in said changed position, and means for directing the welding torch continously in a repeat circuit through the same predetermined closed path.

References Cited in the file of this patent
UNITED STATES PATENTS

| | | |
|---|---|---|
| 1,949,251 | Gilbert | Feb. 27, 1934 |
| 2,152,785 | Blankenbuehler | Apr. 4, 1939 |
| 2,908,805 | Apblett et al. | Oct. 13, 1959 |